United States Patent [19]

Phan et al.

[11] Patent Number: 4,921,899

[45] Date of Patent: May 1, 1990

[54] INK COMPOSITION CONTAINING A BLEND OF A POLYESTER, AN ACRYLIC POLYMER AND A VINYL POLYMER

[75] Inventors: Hieu D. Phan; Gary T. Clark, both of Kingsport, Tenn.

[73] Assignee: Eastman Kodak Company, Rochester, N.Y.

[21] Appl. No.: 256,344

[22] Filed: Oct. 11, 1988

[51] Int. Cl.$^5$ .................... C08L 67/02; C08L 27/06; C08L 33/06
[52] U.S. Cl. .................................. 524/513; 525/166; 525/167
[58] Field of Search ................. 525/166, 167; 524/513

[56] References Cited

U.S. PATENT DOCUMENTS

| | | | |
|---|---|---|---|
| 3,546,008 | 12/1970 | Shields et al. | 524/602 |
| 3,563,942 | 2/1971 | Heiberger | 524/602 |
| 3,607,813 | 9/1971 | Purcell et al. | 524/556 |
| 3,734,874 | 5/1973 | Kibler et al. | 524/602 |
| 3,779,993 | 12/1973 | Kibler et al. | 525/167 |
| 3,907,736 | 9/1975 | Barton et al. | 428/272 |
| 4,022,740 | 5/1977 | Morie et al. | 428/480 |
| 4,072,644 | 2/1978 | Hedrick | 524/548 |
| 4,073,777 | 2/1978 | O'Neill et al. | 428/480 |
| 4,104,262 | 8/1978 | Schade | 528/295 |
| 4,145,469 | 3/1979 | Newkirk et al. | 428/272 |
| 4,148,779 | 4/1979 | Blackwell et al. | 106/22 |
| 4,156,073 | 5/1979 | Login | 528/295 |
| 4,233,196 | 11/1980 | Sublett | 528/295 |
| 4,304,900 | 12/1981 | O'Neill | 528/292 |
| 4,304,901 | 12/1981 | O'Neill et al. | 528/292 |
| 4,335,220 | 6/1982 | Coney | 523/414 |
| 4,340,539 | 7/1982 | Kotera et al. | 524/539 |
| 4,525,524 | 6/1985 | Tung et al. | 524/601 |
| 4,595,611 | 6/1986 | Quick et al. | 428/481 |
| 4,632,874 | 12/1986 | Smith | 524/602 |
| 4,704,309 | 11/1987 | Coney et al. | 427/258 |
| 4,738,785 | 4/1988 | Langston et al. | 210/738 |
| 4,772,491 | 9/1988 | Nealy et al. | 427/336 |

FOREIGN PATENT DOCUMENTS

| | | |
|---|---|---|
| 157476 | 12/1981 | Japan . |
| 57-10663 | 1/1982 | Japan . |
| 124651 | 7/1983 | Japan . |
| 147354 | 9/1983 | Japan . |
| 063162 | 4/1985 | Japan . |
| 2097005A | 10/1982 | United Kingdom . |

OTHER PUBLICATIONS

Product Literature of S. C. Johnson & Sons, Inc., for Joncryl 77, Joncryl 87, Joncryl 134, Joncryl 1535, Joncryl 67, Joncryl 74 and Vancryl 930.
"UCAR ® Waterborne Vinyl Resin Dispersions for Inks, Coatings and Adhesives", 1987, Union Carbide Corporation.
"Airflex ® 7522 DEV Ethylene-Vinyl Chloride (EVCL) Emulsion for Coatings and Adhesives", 1987, Air Products and Chemicals, Inc.
"AIRFLEX ® Ethylene-Vinyl Chloride (EVCL) Emulsions for Specialty Papers", 1981 and 1984, Air Products and Chemicals, Inc.

Primary Examiner—John C. Bleutge
Assistant Examiner—David Buttner
Attorney, Agent, or Firm—Thomas R. Savitsky; Mark A. Montgomery; William P. Heath, Jr.

[57] ABSTRACT

Disclosed is a novel blend of a water-dissipatable polyester material, an acrylic polymer and a water-dissipatable vinyl polymer. The acrylic polymer and the vinyl polymer must be compatible with the polyester. The polyester is exemplified in having an acid component of from about 75 to about 84 mole % isophthalic acid and conversely from about 25 to about 16 mole % 5-sodiosulfoisophthalic acid, and having a glycol component of from about 45 to about 60 mole % diethylene glycol and conversely from about 55 to about 44 mole % 1,4-cyclohexanedimethanol or ethylene glycol or mixtures thereof.

The polymer blends are useful for preparing ink compositions having improved block resistance, water resistance, and alcohol resistance.

14 Claims, No Drawings

INK COMPOSITION CONTAINING A BLEND OF A POLYESTER, AN ACRYLIC POLYMER AND A VINYL POLYMER

FIELD OF INVENTION

The present invention relates to a novel polymer blend useful in printing inks which contains a linear, water-dissipatable polyester or polyesteramide material in combination with an acrylic polymer and a water-dissipatable vinyl polymer.

BACKGROUND OF THE INVENTION

Inks containing a water-dissipatable polyester or polyesteramide are well known in the art (see, for example, U.S. Pat. Nos. 4,704,309 and 4,738,785). Inks containing such a polymeric material have many desirable properties such as good adhesion to a variety of substrates and a wide viscosity range. However, despite the advantages obtained using such a polymeric material in aqueous inks, it is known that aqueous inks with such a polymer by itself have been alleged to have problems, namely poor water resistance and poor block resistance on some substrates (e.g., see Japanese Kokai 57-10663).

In addition, alcohol resistance is a desirable property of inks for some applications. In particular, alcohol/menthol resistance is desirable (as well as water and block resistance) in inks used in the tobacco industry for printing onto cigarette packaging. It would be highly desirable to have a material that imparts good water resistance, block resistance, and alcohol resistance while maintaining the other advantages associated with the use of the water-dissipatable polyester or polesteramide.

SUMMARY OF THE INVENTION

It has now been discovered that the water-dissipatable polyester material as described herein, when mixed with an acrylic polymer and water dissipatable vinyl polymer, will provide to ink compositions good water resistance, good block resistance, and good alcohol resistance without concomitant substantial sacrifice of the advantages obtained by use of the water-dissipatable polyester material alone. This polymer blend can be used to prepare water-based inks, ink overprints and ink primers, which shall be referred to herein collectively as "ink compositions." More specifically, the present invention is directed to a polymer blend comprising:

(A) About 10 to 65 weight percent, based on the weight of (A) plus (B) plus (C) of one or more water-dissipatable or dispersible polymers having carbonyloxy linking groups (i.e., ester groups of the formula

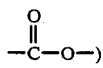

in the linear molecular structure wherein up to 80% of the linking groups are carbonylamido linking groups, (i.e., amide groups of the formula

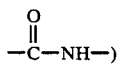

the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows wherein all stated mole percentages are based on the total of all acid, hydroxyl and amino equivalents being equal to 200 mole %:

(a) at least one difunctional dicarboxylic acid;

(b) from about 4 to about 25 mole % of at least one difunctional sulfomonomer containing at least one metallic sulfonate group or nitrogen-containing non-metallic sulfonate group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —CH₂—OH groups of which
  (1) at least 15 mole % is a poly(ethylene glycol) having the structural formula

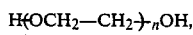

n being an integer of from 2 to about 20, or
  (2) of which from about 0.1 to less than about 15 mole % is a poly(ethylene glycol) having the structural formula

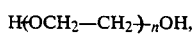

n being an integer of between 2 and about 500, and with the proviso that the mole % of said poly(ethylene glycol) within said range is inversely proportional to the quantity of n within said range; and (d) from none to about 40 mole % of difunctional reactant selected from hydroxycarboxylic acids having one —C(R)₂—OH group, aminocarboxylic acids having one —NRH group, aminoalcohols having one —C(R)₂—OH group and one —NRH group, or mixtures of said difunctional reactants;

wherein each R in the (c) and (d) reactants is a hydrogen atom or an alkyl group of 1 to 4 carbons, (B) an acrylic polymer in an amount of about 15 to 30 percent, based on the total weight of Components (A) plus (B) plus (C), said acrylic polymer being compatible with the water-dissipatable polyester at a maximum acrylic polymer concentration of about 60/40 weight percent of the total acrylic/polyester polymer solids, and (C) a water-dissipatable vinyl polymer in an amount of about 20 to 60 weight percent, based on the weight of (A) plus (B) plus (C), said vinyl polymer being compatible with the water-dissipatable polyester at a maximum vinyl polymer concentration of about 60/40 weight percent of the total vinyl/polyester polymer solids.

The present invention is also directed to an ink composition made from the polymer blend of this invention comprising:

(I) about 5 to 40 weight percent of the polymer blend,
(II) about 0 to 45 weight percent of at least one colorant, and (III) about 35 to 95 weight percent of water.

DETAILED DESCRIPTION OF THE INVENTION

As used herein, the term "water-dissipatable polyester", "water-dissipatable polyester material", "polyester material", or "polyester" refers to Component (A) described hereinabove, "acrylic polymer" refers to Component (B) described hereinabove, "vinyl polymer" refers to Component (C) described hereinabove, and "polymer blend" refers to a blend of Component (A), Component (B), and Component (C).

Whenever the term "water-dissipatable" or "water-dispersible" is used in this description, it will be understood to refer to the activity of a water or aqueous solution on the applicable polymer. The term is specifically intended to cover those situations wherein the solution dissolves and/or disperses the polymer material therein and/or therethrough.

By the phrase "an amount effective to increase the block resistance or water resistance properties of . . . " is meant that amount of acrylic polymer that, when added to the water-dissipatable polyester, will increase the block resistance and/or water resistance of an ink composition as compared to a comparable ink composition without said acrylic polymer.

By the phase "an amount effective to increase the alcohol resistance properties of . . . " is meant that amount of vinyl polymer that, when added to a blend of water dissipatable polyester and acrylic polymer, will increase the alcohol resistance of an ink composition as compared to a comparable ink composition without said vinyl polymer. It is preferred that the water resistance of ink compositions made from the polymer blend of the present invention is at least good; more preferred is excellent. It is also preferred that the alcohol resistance is at least good. It is also preferred, concerning block resistance, that the ink compositions made from the polymer blend of the present invention do not block above about 100° F. (37.78° C.); more preferably do not block above about 120° to 220° F. (48.89° to 104.44° C.), for 5 seconds on a Sentinel Heat Sealer at 40 psi (275.79 kilopascal). Water resistance can be determined by the procedure described in Example 5. Block resistance can be determined by the procedure described in Example 7. Alcohol resistance can be determined by the procedure described in Example 5.

By the term "compatible" is meant that a 60/40 weight blend of acrylic/polyester polymer or vinyl/polyester polymer (or a blend with, appropriately, less acrylic polymer or less vinyl polymer) will not gel or have a significant increase in viscosity after being held at 120° F. (48.89° C.) for 24 hours or at room temperature for 14 days. By the term "gel" or "gelling" is meant that the blend is not pourable at room temperature. A significant viscosity increase after 24 hours at 120° F. (48.89° C.) is typically at least two or three times the viscosity at zero time. The acrylic polymers which are compatible at the higher acrylic concentrations of the polymer blends are preferred. For example, acrylic polymers that are compatible in acrylic concentrations up to a 60/40 weight blend of acrylic/polyester are preferred over acrylic polymers that are compatible only up to a 50/50 weight blend of acrylic/polyester. Preferred acrylic polymers are compatible at acrylic concentrations of at least 30/70 (weight blend of acrylic/polyester) (i.e., at least 30 weight percent acrylic polymer) and more preferred acrylic polymers are compatible at acrylic concentrations of at least 40/60 (i.e., at least 40 weight percent acrylic polymer). Likewise, the vinyl polymers which are compatible at the higher vinyl concentrations of the polymer blends are preferred. For example, vinyl polymers that are compatible in vinyl concentrations of up to a 60/40 weight blend of vinyl/polyester are preferred over vinyl polymers that are compatible only up to a 50/50 weight blend of vinyl/polyester. Preferred vinyl polymers are compatible at vinyl concentrations of at least 30/70 (weight blend of vinyl/polyester) (i.e., at least 30 weight percent vinyl polymer) and more preferred vinyl polymers are compatible at vinyl concentrations of at least 50/50 (i.e. at least 50 weight percent vinyl polymer).

In the polymer blend of the present invention it is preferred that Component (B) is present in an amount effective to increase the block resistance or water resistance properties of Component (A) when formulated into an ink composition; also, preferably, Component (B) is present in an amount of about 20 percent. It is preferred that Component (C) is present in an amount effective to increase the alcohol resistance properties of Component (A) and Component (B) when formulated into an ink composition; also, preferably, Component (C) is present in an amount of about 30 percent. Component (A) is present in an amount of about 10 percent to 65 percent, more preferably about 50 percent. These percentages are based on the total weight of Components (A), (B), and (C).

In the ink compositions of the present invention it is preferred that Component (I) is present in an amount of about 5 to 40 weight percent, that Component (II) is present in an amount of about 0 to 35 weight percent, and that Component III is present in an amount of about 35 to 95 weight percent. If the ink composition is a finished ink, it is preferred that at least about 0.5 weight percent of colorant is present. More typically, in inks, at least about 5 weight percent of colorant is present. If the ink composition contains an organic pigment, typically such an organic pigment is present in an amount of about 17.5 weight percent or less of the total composition. If the ink composition contains an inorganic pigment, typically such inorganic pigment is present in an amount of about 50 weight percent or less of the total composition.

The ink compositions can optionally contain up to about 10 weight percent, preferably up to about 3 weight percent of one or more additives. Such additives include waxes such as Jonwax 26, Jonwax 120 (available from S. C. Johnson and Sons, Inc., Racine, Wisconsin 43403; U.S.A.), or Vanwax 35 (available from Vantage, Garfield, New Jersey 07026); surfactants such as Surfynol 104 and Surfonyl 440 (available from Air Products and Chemicals, Allentown, Pennsylvania 18105); modifiers (for example, defoamers) such as WBT-409, Resolv (available from Vantage), Carbowet 990 (available from Vantage), OT-70 aerosol (available from McIntyre, Chicago, Illinois 60632), Foamaster 111 (available from Henkel Corporation, Morristown, New Jersey 07960); alcohols such as n-propyl alcohol, isopropyl alcohol, propylene glycol, ethylene glycol monobutyl ether, or ethylene glycol; biocides; pH stabilizers; dispersants; thickeners such as Acrysol RM-825 (available from Rohm & Haas, Philadelphia, Pennsylvania 19105); and the like.

Typically, it is desirable to add a small amount of one or more pH stabilizers to the ink compositions to keep the pH within a desired range. For example, it is common to add about 0.1 weight percent sodium acetate to an ink or aqueous solution/dispersion of polymer blend.

Preferred amounts of certain additives in ink compositions of the present invention are set forth in the following table.

| Component | Weight Percent |
|---|---|
| Wax[a] | 0.0–3.0 |
| Surfactant[b] | 0.0–3.0 |
| Modifier[c] | 0.0–2.0 |
| Alcohol[d] | 0.0–8.0 |

[a] e.g., Jonwax 26,120, Vanwax 35
[b] e.g., Surfynol 104,440
[c] e.g., WBT-409, Resolv, Carbowet 990, Aerosol OT-70 Foamaster 111
[d] e.g., n-Propyl Alcohol or Isopropyl Alcohol; Propylene Glycol, Ethylene Glycol Monobutyl Ether In the water-dissipatable polyester useful in the present invention, the metallic portion of the metallic sulfonate group is preferably a monovalent metal such as $Na^+$, $K^+$, or $Li^+$. The nonmetallic portion of the nonmetallic sulfonate group is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, incorporated herein by reference.

In the water-dissipatable polyester it is preferred that very minor, e.g., less than about 10 mol percent based on all reactants, of reactant (d) is employed, that at least about 70 mol percent of reactant (c) is glycol, and that at least about 70 mol percent of all the hydroxy equivalents is present in the glycol. It is also preferred that a substantial portion of reactant (c) is a cycloaliphatic-dimethanol, e.g., up to 50 mole percent of a cycloaliphaticdimethanol such as 1,4-cylcohexanedimethanol.

In preferred other embodiments of the invention:

the water-dissipatable polyester material comprises an acid component (moiety) of from about 75 to about 84 mole percent isophthalic acid and conversely from about 25 to 16 mole percent 5-sodiosulfoisophthalic acid, and a glycol component (moiety) of from about 45 to about 60 mole % diethylene glycol and conversely from about 55 to 40 mole percent 1,4-cyclohexanedimethanol or ethylene glycol (the term "moiety" as used herein designates the residual portion of the reactant acid or glycol which actually enters into or onto the polymer chain during the condensation or polycondensation reaction);

the inherent viscosity of the water-dissipatable polyester material is from about 0.28 to about 0.35, said acid component (moiety) comprises from about 80 to about 83 mole percent isophthalic acid and conversely from about 20 to about 17 mole percent 5-sodiosulfoisophthalic acid, and the glycol component (moiety) comprises from about 52 to about 56 mole percent diethylene glycol and conversely from about 48 to about 44 mole percent 1,4-cyclohexanedimethanol;

the ink composition is printed onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide polypropylene, polyethylene or polystyrene; and after the ink composition is printed, a substantial portion of the initial metal cations of the water solubilizing sulfonate groups of the water-dissipatable polyester material has been replaced with an insolubilizing polyvalent metal cation, such as $Al^{+3}$, $Ca^{++}$, or the like as disclosed and in the manner described in U.S. Pat. Nos. 4,145,469, and 4,704,309, the disclosures of which are incorporated herein by reference in their entirety. As stated therein, generally, based on the weight of the polymeric material, 0.05 percent to about 2.0 percent by weight solids of the polyvalent metal cation are required for effective insolubilization.

The inherent viscosities (I.V.) of the particular water-dissipatable polyester materials useful herein range from about 0.1 to about 1.0 determined according to ASTM D2857-70 procedure, in a Wagner Viscometer of Lab Glass, Inc., of Vineland, New Jersey, having a ½ mL capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n) \frac{25° C.}{0.50\%} = \frac{\ln \frac{t_s}{t_o}}{C}$$

where:

$(n)$ = inherent viscosity at 25° C. at a polymer concentration of 0.25 g/10 mL of solvent;
ln = natural logarithm;
$t_2$ = sample flow time;
$t_o$ = solvent-blank flow time; and
C = concentration of polymer in grams per 100 mL of solvent = 0.25.

The units of the inherent viscosity throughout this application are in deciliters/gram. It is noted that higher concentrations of polymer, e.g., 0.50 g of polymer/100 mL solvent may be employed for more precise I.V. determinations.

As appreciated in the art, the exact components and properties of components desired for any given ink application can vary, and, therefore, routine experimentation may be required to determine the optional components and proportions of components for a given application and desired properties.

The acrylic polymers useful in the present invention are commercially available and/or can be made using conventional techniques known in the art. The molecular weight of the acrylic polymer is at least about 10,000 and preferred is at least about 200,000.

It is preferred that the acrylic polymer useful in the present invention has an acid number of about 200 or less; more preferred is less than about 55 and most preferred is less than about 50. It is also preferred that the glass transition temperature (Tg) of the acrylic polymer is greater than about 0° C.

The acrylic polymer of the present invention preferably comprises repeating units of the formula:

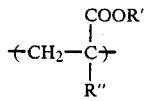

wherein R' is H, a straight, branched, or cyclic alkyl group of 1 to 20 carbon, preferably 1 to 10 carbon atoms, optionally substituted with up to 2 substituents such as $C_1$–$C_6$ alkoxy or halogen such as chloro- or bromo; and R" is H or methyl. More preferably R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

The acrylic polymer can optionally be styrenated and therefore further comprise repeating units of the formula:

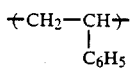

The acrylic polymer can also be a copolymer containing repeating units derived from an acrylonitrile monomer.

The acrylic polymer can be blended with the polyester material and/or vinyl polymer in pure form or either or both or all three polymers can be in a mixture with water or an aqueous solution. The mixture of the acrylic polymer and water or aqueous solution can be in the form of a water-borne alkali soluble resin, a colloidal dispersion, or emulsion. Preferred for use is an emulsion or dispersion of an acrylic polymer having a pH of about 7.5–9.0 and a Brookfield viscosity of about 200–1,000 centipoise (cp) at 25° C. Also preferred is an emulsion containing about 25–55 weight percent of acrylic polymer (more preferred about 45–50 weight percent) with the remainder of the emulsion being water or aqueous solution. If an aqueous solution is used to make the aqueous emulsion or dispersion of acrylic polymer, such emulsion or dispersions will contain one or more additives typically used in the art in amounts of to about 5 weight percent of the emulsion or dispersion, preferably about 1 to about 3 weight percent. Such additives can be emulsion stabilizers, surfactants, dispersants, antimicrobials or biocides, pH stabilizers, and the like. The additives described herein as suitable for use in the ink compositions are also suitable for use with the mixture of acrylic polymer and aqueous solution. The following Table 1 lists certain acrylic polymer emulsions (except for Joncryl 67 which is a solid or flake) commercially available and certain properties thereof. The acrylics having the tradename "Joncryl" are available from S. C. Johnson and Sons, Inc., Racine, Wisconsin 43403, U.S.A. and the acrylics having the tradename Vancryl are available from Vantage.

TABLE 1

| Type | Commercial Name | % Polymer of Nonvolatile | Molecular Weight of Polymer | Acid No. of Polymer | Glass Trans. Temp. of Polymer | Min. Filming Temp. | pH of Emulsion | Viscosity of Emulsion 25° C., CPS |
|---|---|---|---|---|---|---|---|---|
| Acrylic Emulsion | Joncryl 77 | 46 | >200,000 | 55 | 21 | 20 | 8.3 | 500 |
| Styrenated Acrylic Emulsion | Joncryl 87 | 48.5 | >200,000 | 40 | 100 | >80 | 8.3 | 500 |
| Styrenated Acrylic Emulsion | Joncryl 134 | 44.0 | >200,000 | 35 | 95 | 780 | 8.3 | 200 |
| Styrenated Acrylic Emulsion | Joncryl 1535 | 37.0 | >200,000 | 30 | 20 | 15 | 7.5 | 200 |
| Acrylic Emulsion | Joncryl 537 | 46.0 | >200,000 | 40 | 44 | 42 | 9.0 | 150 |
| Styrenated Acrylic Emulsion | Joncryl 619 | 49.0 | >200,000 | 36 | 97 | 35 | 8.2 | 950 |
| Styrenated Acrylic Emulsion | Vancryl 930 | 46.0 | — | — | — | — | 8.7 | 200 |
| Acrylic Emulsion | Joncryl 74 | 48.5 | >200,000 | 50 | −16 | <5 | 8.3 | 500 |
| Solid | Joncryl 67 | 98 | 10,000 | 190 | 70 | — | — | — |

The water-dissipatable vinyl polymers useful in the present invention are commercially available and/or can be made using conventional techniques known in the art. The vinyl polymer useful in the present invention comprises repeating units of the formula:

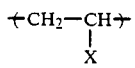

wherein X is halo. The term "halo" as used herein means Cl, Br, or F. It is most preferred that X is Cl.

The average molecular weight of the vinyl polymer is preferably about 4,000–50,000. The preferred glass transition temperature (Tg) of the vinyl polymer is about 0°–100° C. In addition, the vinyl polymer preferably contains about 20–50 weight percent halide.

The vinyl polymer can optionally contain repeating units of ethylene, vinyl acetate, acrylic acid, acrylamide, esters of acrylic acid, substituted acrylamide, and the like. Accordingly, preferred vinyl polymers also comprise repeating units such as of the formulas:

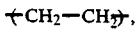

-continued

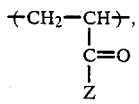

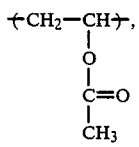

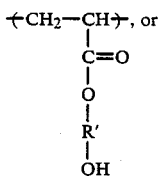

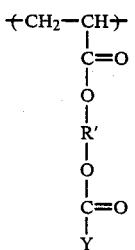

wherein Z is $NH_2$ or OH; R' is as described hereinabove; and Y is a polycarboxylic acid-containing $C_1$ to $C_{20}$ alkyl chain. Also, the vinyl polymer can optionally be substituted with hydroxyl groups on the polymer backbone.

If a mixture of the vinyl polymer is used with water or an aqueous solution, it can be in the form of suspension, dispersion, or emulsion. Preferred for use is an emulsion or dispersion of a vinyl polymer having a pH of about 5-9, a Brookfield viscosity of about 25-4000 cp at 25° C. (more preferred is about 25-2000 cp). Also preferred is a dispersion or emulsion of vinyl polymer containing about 25-60 weight percent of vinyl polymer (more preferred is about 45-55 weight percent) with the remainder of the dispersion being water or an aqueous solution. If an aqueous solution is used to make the aqueous dispersion or emulsion of vinyl polymer, such dispersion or emulsion will contain one or more additives typically used in the art in amounts up to about 5 weight percent of the emulsion or dispersion, preferably about 1 to about 3 weight percent. Such additives can be the same as used in the dispersion or emulsion of acrylic polymer. The following Table 2 lists certain vinyl polymer dispersions or emulsions commercially available and certain properties thereof. The vinyl polymers having the trade name "Airflex" are available from Air Products and Chemicals, Inc., Allentown, Pennsylvania 18105, U.S.A.; and the vinyl polymers having the trade name "UCAR" are available from Union Carbide Corporation, Danbury, Connecticut 06817-0001, U.S.A.

TABLE 2

| Type | Commercial Name | % Non Volatiles | Glass Trans. Temp. | pH of Emulsion | Viscosity of Emulsion 25° CPS |
|---|---|---|---|---|---|
| Ethylene-Vinyl Chloride Emulsion | Airflex 4500 | 50 | 0 | 7-9 | 25-150 |
| Ethylene-Vinyl Chloride Emulsion | Airflex 4514 | 50 | 14 | 7-9 | 25-150 |
| Ethylene-Vinyl Chloride Emulsion | Airflex 4530 | 50 | 30 | 30 | 25-150 |
| Ethylene-Vinyl Chloride Emulsion | Airflex 7522 Dev | 48 | 22 | 5-6 | 150-400 |
| Waterborne Vinyl Dispersion | UCAR AW-100 | 31 | 60 | 6.7-7.7 | 2000 |

Of course, it is contemplated that two or more polyester materials, two or more vinyl polymers, and/or two or more acrylic polymers can be used in the present invention. The water-dissipatable polyester can be made by known techniques, for example, by those disclosed in U.S. Pat. Nos. 3,734,874; 3,779,993; and 4,233,196; the disclosures of which are incorporated herein by reference in their entirety.

The aqueous solution or dispersion of water-dissipatable polyester to be blended with the acrylic polymer dispersion and/or vinyl polymer dispersion preferably comprises about 26 to 38 weight percent of polyester material with the remainder being water or an aqueous solution. The aqueous solution can be the same or be similar to the aqueous solution used to make the aqueous dispersion or emulsion of acrylic polymer, with the amount of additives being present in an amount of up to about 5 weight percent, preferably about 1 to about 3 weight percent.

The ink compositions of this invention can be for any of the typical ink applications such as flexographic, gravure, letterpress, ink-jet, or screen-process printing applications. The ink compositions of the present invention have excellent adhesion to a wide variety of substrates including plastic films such as polyester, polyethylene or polypropylene; aluminum foil; glass; and paper.

The ink compositions of the present invention should have a pH of about 8.2 or lower; preferred is a pH of about 7 to 8. If the pH is higher than about 8.2, there is a danger of the polymer(s) hydrolyzing which results in gelling of the system.

The polyester material can be dispersed in water or aqueous solution using the techniques described herein or known in the art and then blended with an aqueous dispersion or emulsion of acrylic polymer and/or vinyl polymer prepared by similar techniques, or blended with an aqueous emulsion or dispersion of acrylic polymer and/or vinyl polymer in a form commercially available. The following procedure can be used for dispersing the polyester in water: The water should be preheated to about 180° F. (82.22° C.) to about 200° F. (93.33° C.) and the polyester in pellet form is added rapidly to the vortex under high shear stirring. A Cowless Dissolver, Waring Blender, or similar equipment may be used. Once the water is heated to the desired temperature, additional heat input is not required. Depending upon the volume prepared, dispersion of the pellets should be complete within 15 to 30 minutes stirring. Continued agitation with cooling may be desirable to prevent thickening at the surface due to water evaporation. Viscosities of the dispersions remain low up to polyester levels of 25 percent to 30 percent and viscosities increase sharply above these levels. Viscosities of the dispersions will be influenced by the degree of polymer dispersion obtained which is affected by the dispersing temperature, shear, and time. The polyester blend content typically may range from about 15 percent to about 50 percent by weight of the aqueous dispersion with the preferred for most applications being from about 26 percent to about 38 percent.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows: The colorant is added to the polymer blend dispersion and, at a properly adjusted viscosity, dispersed thereinto with ball mill, sand mill, high-shear fluid flow mill, Cowles Dissolver, Katy Mill or the like. The colorants also may be dispersed directly in the polymer by milling on a heated two-roll mill at about 220° to 360° F. (104.44° to 182.22° C.) and using processing aids as desired, such as solvents or plasticizers. The viscosity and printing characteristics of the ink composition may be modified further by addition of water, solvents, plasticizers, sequestered wax, surfactants and the like to suit the particular printing needs. The amounts and nature of these optional additives have been previously described herein.

The present invention is not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

Exemplary useful C.I. pigments for use in the present invention are given in the following table:

| Generic Name | Pigments C.A. Index/Chemical Name |
|---|---|
| C.I. Pigment Yellow 17 | Butanamide, 2,2'-[(3,3'-dichloro[1,1'-biphenyl]4,4'-diyl)bis(azo)bis[N-(2-methoxypehnyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethyl-amino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethyl-amino)-3-ethylimino)-2,7-dimethyl-3H-xanthen-9-yl]-, ethyl ester, molybdatesilicate |
| C.I. Pigment Red 81:x | Benzoic acid, 2-[6-(ethyl-amino)-3-(ethylimino)-2,7-dimethyl-3H-xanthen-9-yl]-, ethyl ester, molybdatephosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxy-phenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)-phenyl]-[4-(phenylimino)-2,5-cyclohexadien-1-ylidene]methyl]-phenyl] amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethyl-amino)-3H-xanthen-3-ylidene]-N-ethyl-, molybdatetungstatephosphate |
| C.I. Pigment White 6 | Titanium oxide ($TiO_2$) |
| C.I. Pigment Blue 15 | Copper, [29H, 31H-phthalocyaninato (2-)-$N^{29}$, $N^{30}$, $N^{31}$, $N^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino] phenyl]-[4-[(3-methyl-phenyl)-imino]-2-5-cyclohexadien-1-ylidene]methyl]-phenyl] amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N-(2-methylpheny10-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-$N^{29}$, $N^{30}$, $N^{31}$, $N^{32}$]-, (SP-4-1)- |
| C.I. Pigment Yellow 1 | Butanamide, 2-[(4-methyl-2-nitrophenyl)azo]-3-oxo-N-phenyl- |
| C.I. Pigment Yellow 3 | Butanamide, 2-[(4-chloro-2-nitrophenyl) azo]-N-(2-chlorophenyl)-3-oxo- |
| C.I. Pigment Yellow 13 | Butanamide, 2,2'-[(3,3'-dichloro[1,1'-biphenyl]-4,4'-diyl)bis(azo)]bis [N-(2,4-dimethylphenyl)-B-oxo- |
| C.I. Pigment Orange 16 | Butanamide, 2,2'-[(3,3'- |

4,921,899

| Pigments | |
|---|---|
| Generic Name | C.A. Index/Chemical Name |
| C.I. Pigment Yellow 55 | dimethoxy[1,1'-biphenyl]-4,4'-diyl)bis(azo)]bis[3-oxo-N-phenyl-Butanamide, 2,2'-[(3,3'-dichloro[1,1'-biphenyl]-4,4'-diyl)bis(azo)]bis[N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis(azo)]bis[2,4-dihydro-5-methyl-2-phenyl- |
| C.I. Pigment Orange 34 | 3H-Pyrazol-3-one,4,4'-[(3,3'-dichloro[1,1'-biphenyl]-4,4'-diyl)bis(azo)]bis[2,4-dihydro-5-methyl-2-(4-methylphenyl)- |
| C.I. Pigment Blue 62 | 4,4'-Bis(diethylamino)benzophenone condensed with N-ethyl-1-naphthylamine in toluene with phosphorous oxychloride and converted to the copper ferrocyanide salt (PTMA salt in P.Blue 1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl)phenyl]azo]-N-(2-ethoxyphenyl)-3-hydroxy- |
| C.I. Pigment Red 88 | Benzo[b]thiophen-3(2H)-one, 4,7-dichloro-2-(4,7-dichloro-3-oxobenzo[b]thien-2(3H)-ylidene)- |
| C.I. Pigment Yellow 151 | A diazotized aniline derivative coupled with an acetoacetyl derivative of 5-aminobenzimidazolone |
| C.I. Pigment Violet 23 | Diindolo[3,3',2'm]triphenodioxazine, 8-18-dichloro-5,15-diethyl-5,15-dihydro- |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4-(diethylamino)phenyl][4-(ethylamino)-1-1 naphthalenyl]methylene]-2,5-cyclohexadien-1-ylidene]-N-ethyl-, [orthosilicato(4-)]hexatriacontaoxododecamolybdate(4-)-(4:1) |
| C.I. Pigment Red 3 | 2-Naphthalenol, 1-[(4-methyl-2-nitrophenyl)azo]- |
| C.I. Pigment Blue 15:1 | Copper,[29H,32H-phthalocyaninato(2-)-$N^{29}, N^{30}, N^{31}, N^{32}$]-,(SP-4-1)- or Copper,[chloro-29H,31H-phthalocyaninato(2-1)-$N^{29}, N^{30}, N^{31}, N^{32}$]- |
| C.I. Pigment Red 23 | 2-Naphthalenecarboxamide, 3-hydroxy-4-[(2-methoxy-5-nitrophenyl)azo]-N-(3-nitrophenyl)- |

| Pigments | |
|---|---|
| Generic Name | C.A. Index/Chemical Name |
| C.I. Pigment Red 112 | 2-Naphthalenecarboxamide, 3-hydroxy-N-(2-methylphenyl)-4-[(2,4,5-trichlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P.Red 81:1). |
| C.I. Pigment Orange 5 | 2-Naphthalenol, 1-](2,4-dinitrophenyl)azo]- |
| C.I. Pigment Orange 13 | 3H-Pyrazol-3-one, 4,4'-[(3,3'-dichloro[1,1'-biphenyl]-4,4'-diyl)bis(azo)]bis[2,4-dihydro-5-methyl-2-phenyl- |
| C.I. Pigment Orange 34 | 3H-Pyrazol-3-one, 4,4'-[(3,3'-dichloro[1,1'-biphenyl]-4,4'-diyl)bis(azo)]bis[2,4-dihydro-5-methyl-2-(4-methylphenyl)- |
| C.I. Pigment Red 10 | 2-Naphthalenecarboxamide, 4-[(2,5-dichlorophenyl)azo]-3-hydroxy-N-(4-methylphenyl)- |
| C.I. Pigment Blue 1:X | Ethanaminium, N-[4-[[4-(diethylamino)phenyl][4-(ethylamino)-1-naphthalenyl]methylene]-2,5-cyclohexadien-1-ylidene]-N-ethyl-, molybdatephosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$). some FeO and $Fe_2O_3.H_2O$ |
| C.I. Pigment Brown 7 | Iron oxide ($Fe_2O_3$) plus varying amounts of clay |
| C.I. Pigment Brown 7:X | $Fe_2O_3 \cdot X MnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |

In accordance with the present invention, ink compositions prepared from the above polymer blends may be superior over prior aqueous ink compositions in one or more of such properties as pigment wetting, pigment stability, temperature stability (heat and freeze-thaw), nonsettling for extended periods of time, nonpolluting with respect to odor and volatile organics, nonflocculating, long "open" time in the press fountain, wide viscosity range inks, adhesion to a variety of substrates, hardness, gloss, drying rate on substrates, film-forming properties at low temperatures without organic co-solvents, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility, redispersibility or rewetting, crinkle resistance, solvent resistance, alkali, chemical and detergent resistance, blocking resistance, lightfastness, heat resistance, slip angle, coefficient of friction, toughness, substrate wetting, hold-out, opacity, dry-rate, and no offset on the printing press (coating e.g. on tension rollers).

The following examples are to illustrate the invention but should not be interpreted as a limitation thereon. All percentages are by weight unless otherwise indicated.

EXAMPLE 1 - POLYESTER PREPARATION

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 milliliter (mL) of a 1.0% (based on Ti) catalyst solution of titanium tetraisopropoxide, and 0.74 gram (g) (0.009 mole) of sodium acetate buffer is stirred and heated for two hours at 200°–220° C. The temperature is then raised to 275° C. and a vacuum of 0.3 millimeter (mm) is applied. Heating and stirring is continued for 1 hour under these conditions. After cooling, the polymer obtained has an inherent viscosity (I.V.) of 0.36 and is tough and rubbery. It is dissipatable in hot water to the extent of about 29 weight percent to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol.

EXAMPLE 2 - POLYESTER DISPERSION PREPARATION

To 1,388.27 g of distilled water is added 660.0 g of polyester polymer, from Example 1 with stirring. The mixture is heated at 90° C. for two hours with stirring. The dispersion is cooled to 75° C. and 227.5 g of n-propyl alcohol is added dropwise with stirring. The dispersion is allowed to cool to 35° C. with stirring and 13.65 g of Tekamer 38 AD (biocide) is added with stirring. The clear polyester dispersion has the following composition.

| Component | Weight, % |
| --- | --- |
| Polyester Polymer (Example 1) | 28.91 |
| n-Propyl Alcohol | 10 |
| Tektamer 38AD | 0.6 |
| Water | 60.49 |

EXAMPLE 3 - PREPARATION OF WATER-BASED OVERPRINT VARNISH

The overprint varnishes (OPV) are made by slowly adding Joncryl 537 and Airflex 4530 (see Table 1) to the polyester dispersion of Example 2 with stirring. The amounts of each component used and the resulting weight percent of Joncryl and Airflex polymers (% of total polymer solids) contained in the varnish is listed in Table 2. These varnishes are stirred for five minutes and then filtered through a cheese cloth.

TABLE 2

| Composition of Overprint Varnish | | |
| --- | --- | --- |
| % Joncryl 537/ Airflex 4530 (40/60 Weight Ratio) Emulsion Used | % Polyester Dispersion Used | % Solid Joncryl 537 and Airflex 4530 Per Total Polymer Solids |
| 0.00 | 100.0 | 0.00 |
| 3.08 | 96.92 | 5.00 |
| 6.29 | 93.71 | 10.00 |
| 9.63 | 90.37 | 15.00 |
| 13.12 | 86.88 | 20.00 |
| 16.76 | 83.24 | 25.00 |
| 20.57 | 79.43 | 30.00 |
| 24.55 | 75.45 | 35.00 |
| 28.71 | 71.29 | 40.00 |
| 33.78 | 66.22 | 45.78 |

EXAMPLE 4 - SAMPLE PREPARATION

The varnishes are applied on Aluminum Foil and Polypropylene with a Number 3 and 6 Meyer rod and with a Gravure and Flexo Handproofer. These samples are then allowed to dry for 24 hours at 70° F. (21.11° C.), 60% relative humidity or dried in the oven at 100° C. for 3 seconds.

EXAMPLE 5 - WATER RESISTANCE AND ALCOHOL RESISTANCE EVALUATION OF OVERPRINTS

The overprints of Example 3 are applied to aluminum foil as described in Example 4. The water resistance of the samples are determined by the water spot test.

Water Spot Test - Distilled water drops were left on the film surface for 1, 5, and 20 minutes, then wiped off gently with a facial tissue. The integrity of the film is visually assessed.

The water spot test is rated as follows:
1. Poor: Total film removal
2. Fair: Partial film removal
3. Good: Dull or discolor film, but no removal
4. Excellent: The film is substantially unchanged The alcohol resistance of the samples is determined by the alcohol/menthol spot test.

Alcohol/Menthol Spot Test—The alcohol/menthol solution drops were applied to a printed substrate and left on the ink film surface for 1 and 5 minutes, then wiped off gently with a facial tissue. The same rating system is used as for the water spot test. The composition of the alcohol/menthol solution used to test the alcohol resistance is as follows:

| Weight % | Ingredients |
| --- | --- |
| 50.0000 | L-menthol |
| 49.9905 | Ingestible ethyl alcohol (190 proof) |
| 0.0094 | Nicotine |
| 0.0001 | Methylene Blue |

The test results for the overprint varnishes of Table 2 are shown in Tables 3A and 3B. At least 30% Joncryl 537/Airflex 4530 (total polymer solids) is shown to obtain good water resistance. The water resistance and alcohol resistance can also be determined by a water soak test or alcohol soak test.

TABLE 3A

Effect of Joncryl 537/Airflex 4530 on Water and Alcohol Resistance of Overprint Varnish

| Weight % Joncryl 537 + Airflex 4530 Emulsions Used | Weight % Polyester Dispersion Used | Weight % Solid Joncryl 537 + Airflex 4530 Polymers Per Total Polymer Solids | Water Res. Rating (Spot Test on Foil @ 20 Min.) | Alcohol Resistance Rating (Spot Test On Foil @ 5 Min.) |
|---|---|---|---|---|
| 0.00 | 100.00 | 0.00 | 1 | 4 |
| 3.08 | 96.92 | 5.00 | 1 | 4 |
| 6.29 | 93.71 | 10.00 | 1 | 4 |
| 9.63 | 90.37 | 15.00 | 1 | 4 |
| 13.12 | 86.88 | 20.00 | 1 | 4 |
| 16.76 | 83.24 | 25.00 | 1 | 4 |
| 20.57 | 79.43 | 30.00 | 3 | 4 |
| 24.55 | 75.45 | 35.00 | 3 | 4 |
| 28.71 | 71.29 | 40.00 | 3 | 4 |
| 33.78 | 66.22 | 45.78 | 4 | 4 |

TABLE 3B

Effect of Airflex 4530 on Alcohol Resistance of Polyester/Joncryl 537 Overprint Varnish

| Weight % Solid of Airflex 4530 per Total Polymer Solids | Alcohol Resistance Rating (5 Min.) |
|---|---|
| 0* | 1 |
| 5 | 1 |
| 10 | 1 |
| 15 | 2 |
| 20 | 3 |
| 25* | 4 |
| 30 | 4 |
| 35 | 4 |
| 40 | 4 |
| 45 | 4 |

*75 wt. % polyester and 25 wt. % Joncryl 537 (total polymer solids)
*25% Airflex 4530, 56% polyester, and 19% Joncryl (total polymer solids)

EXAMPLE 6 - PREPARATION OF PRINTING INKS

An ink millbase is made by adding 100.0 g of blue pigment, PV Fast Blue B2G-A from Hoechst (Color Index Pigment Blue 15:3), 2.0 g of defoamer and 96.0 of water to 202.0 g of polyester dispersion (Example 2). The mixture is then shaken with 400.0 g of glass beads for 4 hours on a paint shaker and is filtered through cheese cloth. To 50.0 g of the filtrate is added with stirring 49.5 g of a Joncryl 537/Airflex 4530 (40/60 weight ratio) emulsion and 0.5 g of defoamer. Each ink contains 12.5% pigment, 0.75% defoamer, and varying percents of the polyester dispersion and Joncryl 537/Airflex 4530 emulsion as shown in Table 4, the percentages being by weight.

The printing inks are alternatively made by slowly adding 12.6 g of Joncryl 537 and 19.4 g Airflex 4530, 5.3 g millbase containing HR yellow (C.I. Pigment Yellow 83) 25% pigment, 2.48 millbase containing naphthol red (C.I. Pigment Red 22) 29.8 pigment, and 3 g isopropyl alcohol to 57.3 g of polyester dispersion. The ink is stirred for 5 minutes and then filtered through a cheese cloth.

TABLE 4

Printing Ink Compositions

| % Polyester Dispersion | % Joncryl 537/ Airflex 4530 Emulsion | % Solid Joncryl 537/ Airflex 4530 Per Total Polymer Solids |
|---|---|---|
| 74.75 | 0.00 | 0.00 |
| 72.45 | 2.30 | 5.00 |
| 70.05 | 4.70 | 10.00 |
| 67.55 | 7.20 | 15.00 |
| 64.94 | 9.81 | 20.00 |
| 62.22 | 12.53 | 25.00 |
| 59.38 | 15.37 | 30.00 |
| 56.40 | 18.35 | 35.00 |
| 53.29 | 21.46 | 40.00 |
| 49.50 | 25.25 | 45.78 |

The samples and water resistance of these inks are prepared and determined by the same methods as used for the overprint varnishes. The results of the water resistance test and alcohol resistance test are in Table 5.

TABLE 5

Water Resistance and Alcohol Resistance of Polyester Inks

| Weight % Solid Joncryl 537/ Airflex 4530 Per Total Polymer Solids in Finished Ink | Water Res. Rating (Spot Test on Foil @ 20 Minutes) | Alcohol Res. Rating (Spot Test On Foil @ 5 Min.) |
|---|---|---|
| 0.00 | 1 | 4 |
| 5.00 | 11 | 4 |
| 10.00 | 1 | 4 |
| 15.00 | 1 | 4 |
| 20.00 | 1 | 4 |
| 25.00 | 1 | 4 |
| 30.00 | 2 | 4 |
| 35.00 | 3 | 4 |
| 40.00 | 3 | 4 |
| 45.78 | 4 | 4 |

EXAMPLE 7 - COMPATIBILITY TEST

The compatibility test of the polymer blends in the ink composition is monitored by pH readings, viscosity change and observed gelling after aging the sample for 2 weeks in the oven at 120° F. (48.89° C.) and 4 weeks at room temperature, 70° F. (21.11° C.), and also after putting them in the freezer at −25° F. (−31.67° C.) for 24 hours (3 cycles). The results of one sample are in Table 6.

TABLE 6

Stability of Printing Ink (With 45.78% Joncryl 537 Airflex/4530 (40/60 Weight Ratio) Per Total Polymer Solids) (See Table 4)

| | pH | Viscosity (#2 Zahn Cup) [Second] |
|---|---|---|
| *Initial | 7.90 | 19 |
| *At Room Temperature 70° F. (21.11° C.) | | |
| After 1 week | 7.80 | 20 |
| After 2 weeks | 7.78 | 20 |
| After 4 weeks | 7.70 | 20 |
| *In the Oven 120° F. (48.89° C.), 2 Weeks | | |
| | 7.74 | 22 |
| *In the Freezer −25° F. (−31.67° C.), 17 Hours, 3 Cycles | | |
| | 7.77 | 20 |

The invention has been described in detail with particular reference to preferred embodiments thereof, but it will be understood that variations and modifications can be effected within the spirit and scope of the invention.

We claim:

1. A polymer blend comprising:
   (A) about 10 to 65 weight percent, based on the weight of (A) plus (B) plus (C) of one or more linear water-dissipatable polymers having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from (1), (2), (3), and (4), or the ester forming or esteramide forming derivatives thereof, as follows, wherein all stated mole percentages are based on the total of all acid, hydroxyl and amino equivalents being equal to 200 mole %:
   (1) at least one difunctional dicarboxylic acid;
   (2) from about 4 to about 25 mole % of at least one difunctional sulfomonomer containing at least one metallic sulfonate group or nitrogen-containing non-metallic sulfonate group attached to an aromatic or cycloaliphatic nucleus wherein the functional groups are hydroxy, carboxyl or amino;
   (3) at least one difunctional reactant selected from a glycol or a mixture of a glycol and diamine having two —NRH groups, the glycol containing two —CH$_2$—OH groups of which
      (a) at least 15 mole % is a poly(ethylene glycol) having the structural formula

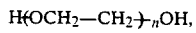
   H(OCH$_2$—CH$_2$)$_n$OH, n being an integer of from 2 to about 20, or
      (b) of which from about 0.1 to less than about 15 mole % is a poly(ethylene glycol) having the structural formula

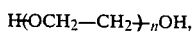
   H(OCH$_2$—CH$_2$)$_n$OH, n being an integer of between 2 and about 500, and with the proviso that the mole % of said poly(ethylene glycol) within said range is inversely proportional to the quantity of n within said range; and
   (4) from none to about 40 mole % of difunctional reactant selected from hydroxycarboxylic acids having one —C(R)$_2$—OH group, aminocarboxylic acids having one —NRH group, and aminoalcohols having one —C(R)$_2$—OH group and one —NRH group, or mixtures of said difunctional reactants;
   wherein each R in the (3) and (4) reactants is a hydrogen atom or an alkyl group of 1 to 4 carbons;
   (B) an acrylic polymer in an amount of about 15 to 30 percent, based on the total weight of Components (A) and (B), said acrylic polymer being compatible with the water-dissipatable polyester at an acrylic polymer concentration of about 30 weight percent of the total acrylic/polyester polymer solids, and
   (C) a water-dissipatable vinyl polymer in an amount of about 20 to 60 weight percent, based on the weight of (A) plus (B) plus (C), said vinyl polymer being compatible with the water-dissipatable polyester at a vinyl polymer concentration of about 30 weight percent of the total vinyl/polyester polymer solids, and wherein said vinyl polymer comprises repeating units of the formula

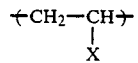
$$+CH_2-CH+$$
$$\phantom{+CH_2-}|$$
$$\phantom{+CH_2-}X$$

wherein X is halo.

2. The polymer blend of claim 1 wherein said acrylic polymer is also compatible with the water-dissipatable polyester at an acrylic concentration of 40/60 based on the weight of a blend of acrylic polymer/water-dissipatable polyester, and said vinyl polymer is also compatible with the water-dissipatable polyester at a vinyl concentration of 50/50 based on the weight of a blend of vinyl polymer/water-dissipatable polyester.

3. The polymer blend of claim 1 wherein said acrylic polymer is also compatible with the water-dissipatible polyester at an acrylic concentration of 60/40 based on the weight of a blend of acrylic polymer/water-dissipatable polyester, and said vinyl polymer is also compatible with the water-dissipatable polyester at a vinyl concentration of 60/40 based on the weight of a blend of vinyl polymer/water-dissipatable polyester.

4. The polymer blend of claim 1 wherein Component (A) comprises one or more polyesters having an inherent viscosity of from about 0.28 to about 0.35, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof.

5. The polymer blend of claim 4 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

6. The polymer blend of claim 1 wherein Component (B) comprises at least one acrylic polymer having a molecular weight of at least about 200,000, an acid number of less than about 55, and a Tg of greater than 0° C.; and Component (C) comprises at least one vinyl polymer having a molecular weight of 4,000–50,000, a Tg of about 0°–100° C. and a halide content of about 20–50 weight percent.

7. The polymer blend of claim 1 wherein said acrylic polymer of Component (B) comprises repeating units of the formula:

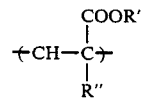
$$\phantom{+CH-}COOR'$$
$$\phantom{+CH-C}|$$
$$+CH-C+$$
$$\phantom{+CH-}|$$
$$\phantom{+CH-}R''$$

wherein R' is H or is a straight, branched, or cyclic alkyl group of 1 to 10 carbon atoms, substituted with 0 to 2 substituents selected from the group consisting of C$_1$-C$_6$ alkoxy and halogen; and R'' is H or methyl.

8. The polymer blend of claim 7 wherein R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl; and X is Cl.

9. The polymer blend of claim 7 wherein said acrylic polymer further comprises repeating units of the formula:

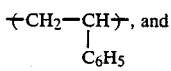, and said vinyl polymer further comprises one or more repeating units of the formula

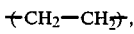,

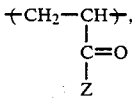,

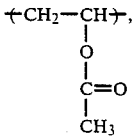,

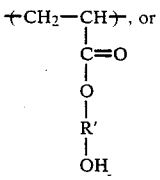, or

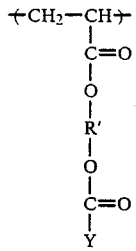

wherein Z is $NH_2$ or OH; R' is as previously defined; and Y is a polycarboxylic acid-containing $C_1$ to $C_{20}$ alkyl chain.

10. The polymer blend of claim 1 wherein Component (B) is present in an amount effective to increase the block resistance or water resistance properties of the blend when formulated into an ink composition; and wherein Component (C) is present in an amount effective to increase the alcohol resistance properties of the blend when formulated into an ink composition.

11. The polymer blend of claim 1 wherein Component (A) is present in an amount of about 50%, Component (B) is present in an amount of about 20%, and Component (C) is present in an amount of about 30%.

12. The polymer blend of claim 1 wherein Component (A) is in the form of an aqueous composition comprising 26 to 38 weight percent of polyester material with the remainder of the aqueous composition being water or an aqueous solution; Component (B) is in the form of an aqueous emulsion or dispersion containing about 25 to 55 weight percent of acrylic polymer with the remainder being water or an aqueous solution; Component (C) is present in the form of an aqueous emulsion or dispersion containing about 25 to 60 weight percent of vinyl polymer with the remainder being water or an aqueous solution; and wherein Component (B) has a pH of about 7.5 to 9.0 and a Brookfield viscosity of about 200 to 1,000 CP at 25° C. and wherein Component (C) has a pH of about 5 to 9 and a Brookfield viscosity of about 25 to 2,000 at 25° C.

13. The polymer blend of claim 12 wherein either or each of Components (A), (B), and (C) additionally comprises up to 5 weight percent of one or more additives.

14. The polymer blend of claim 12 wherein one, two or all three Components (A), (B), and (C) additionally comprises about 1 to about 3 weight percent of one or more additives selected from the group consisting of an emulsion stabilizer, a surfactant, a dispersant, a biocide, and a pH stabilizer.

* * * * *